(12) United States Patent
Greene

(10) Patent No.: US 7,293,831 B2
(45) Date of Patent: Nov. 13, 2007

(54) INTEGRATED UNDER-SEAT INTERIOR LIGHTING FOR A MOTOR VEHICLE SEAT

(75) Inventor: Darrell Frederick Greene, Huntsville (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 42 days.

(21) Appl. No.: 11/398,283

(22) Filed: Apr. 4, 2006

(65) Prior Publication Data
US 2007/0228786 A1    Oct. 4, 2007

(51) Int. Cl.
    *A47C 7/62* (2006.01)
(52) U.S. Cl. .................................................. 297/217.6
(58) Field of Classification Search ............. 297/217.6, 297/344.1; 362/131, 483, 487
    See application file for complete search history.

(56) References Cited

U.S. PATENT DOCUMENTS

| | | | |
|---|---|---|---|
| 2,635,681 A * | 4/1953 | Hiltman et al. .......... 297/217.6 |
| 6,040,532 A * | 3/2000 | Munch ........................ 177/144 |
| 6,244,660 B1 * | 6/2001 | Yoshimatsu ............... 297/344.1 |
| 6,353,394 B1 * | 3/2002 | Maeda et al. ................ 340/667 |
| 6,428,096 B2 * | 8/2002 | Reitze ....................... 297/217.6 |
| 6,431,734 B1 * | 8/2002 | Curry ......................... 362/488 |
| 6,460,934 B1 * | 10/2002 | Langer et al. ........... 297/463.1 |
| 6,561,684 B2 * | 5/2003 | Reitze et al. ................ 362/488 |
| 6,775,606 B1 * | 8/2004 | Ertl et al. ..................... 701/49 |

\* cited by examiner

*Primary Examiner*—Milton Nelson, Jr.
(74) *Attorney, Agent, or Firm*—Richard M. Mescher; Porter, Wright, Morris & Arthur; Dean B. Watson

(57) ABSTRACT

A powered adjustable seat assembly for a motor vehicle includes a seat, an adjuster mechanism operatively connected to the seat to adjust the seat, a controller operatively connected to the drive motor of the adjuster mechanism to selectively adjust the seat, and a plurality of lights located below the seat and operatively connected to the controller to selectively illuminate the lights upon predetermined conditions. The lights are secured to a moving portion of the adjuster mechanism so that the lights move with the seat. Preferably, one of the lights is positioned to direct illumination in a forward direction toward operator pedals, one of the lights is positioned to direct illumination in a rearward direction toward a rear seat, and one of the lights is positioned to direct light in a lateral direction toward a vehicle door.

20 Claims, 2 Drawing Sheets

INTEGRATED UNDER-SEAT INTERIOR LIGHTING FOR A MOTOR VEHICLE SEAT

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to seat assemblies for motor vehicles and, more particularly, to powered adjustable seat assemblies for motor vehicles.

BACKGROUND OF THE INVENTION

Motor vehicles typically have adjustable seat assemblies that provide for a seat to be moved or adjusted in a forward/rearward direction by an adjuster mechanism. Adjuster mechanisms typically have a pair of spaced apart track assemblies. Each track assembly typically includes a first track member that is mounted to the vehicle and a second track member that is supported for movement relative to the first track member and has the seat secured thereto. The first and second track members are usually mounted in a horizontal configuration. The seat is horizontally adjusted in the forward/rearward direction by sliding the second track members relative to the first track members. This is often referred to as a "two-way" adjustable seat. The adjustable seat assembly can also provide for the seat to be moved or adjusted in a upward/downward direction. The seat is usually adjusted in an upward/downward direction by raising/lowering the seat relative to the track assemblies. This is often referred to as a "four-way" adjustable seat. The adjustable seat assembly can additionally provide for the forward and rearward edges of the seat bottom to be moved or adjusted in an upward/downward direction independently of each other and/or provide for a seat back to be pivoted or adjusted in a forward/rearward direction relative to a seat bottom. These are often referred to as a "six-way" adjustable seat or an "eight-way" adjustable seat. Of course, any combination of the above-described seat adjustments can be utilized in particular adjustable motor vehicle seat.

Motor vehicles also typically have a number of interior lamps or lights so that portions of the vehicle interior can be illuminated under certain conditions. For example, motor vehicles typically have an overhead lamp that is automatically illuminated when a vehicle door is open so that a passenger can more easily enter or egress the motor vehicle.

While prior seat assemblies may adequately adjust the horizontal position of the seats and illuminate the interior respectively under some conditions, there are other conditions in which operation is less than desirable. For example, if a passenger desires to safely adjust their seat at night, they must either open the door to activate the overhead lamp or manually activate the overhead lamp. Additionally, there is a never ending desire in the motor vehicle industry to reduce cost and weight of vehicle systems. Accordingly, there is a need in the art for an improved powered adjustable seat assembly for a motor vehicle.

SUMMARY OF THE INVENTION

The present invention provides powered adjustable seat assembly for a motor vehicle which overcomes at least some of the above-noted problems of the related art. According to the present invention, powered adjustable seat assembly for a motor vehicle comprises, in combination, a seat, an adjuster mechanism operatively connected to the seat to adjust the seat in at least one direction, a controller operatively connected to a drive motor of the adjuster mechanism to selectively adjust the seat, and at least one light located below the seat and operatively connected to the controller to selectively illuminate the light.

According to another aspect of the present invention, powered adjustable seat assembly for a motor vehicle comprises, in combination, a seat, an adjuster mechanism operatively connected to the seat to adjust the seat in at least one direction, a controller operatively connected to a drive motor of the adjuster mechanism to selectively adjust the seat, and a plurality of lights located below the seat and operatively connected to the controller to selectively illuminate the lights upon predetermined conditions. The lights are secured to a moving portion of the adjuster mechanism so that the lights move with the seat when the seat is adjusted.

According to yet another aspect of the present invention, a powered adjustable seat assembly for a motor vehicle comprises, in combination, a seat, an adjuster mechanism operatively connected to the seat to adjust the seat in at least one direction, a controller operatively connected to the drive motor of the adjuster mechanism to selectively adjust the seat, and a plurality of lights located below the seat and operatively connected to the controller to selectively illuminate the lights upon predetermined conditions. At least one of the lights is positioned to direct illumination in a forward direction toward operator pedals, at least one of the lights is positioned to direct illumination in a rearward direction toward a rear seat, and at least one of the lights is positioned to direct light in a lateral direction toward a vehicle door.

From the foregoing disclosure and the following more detailed description of various preferred embodiments it will be apparent to those skilled in the art that the present invention provides a significant advance in the technology and art of powered adjustable seat assemblies for motor vehicles. Particularly significant in this regard is the potential the invention affords for providing a high quality, reliable, efficient, and low cost assembly with integrated lights. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
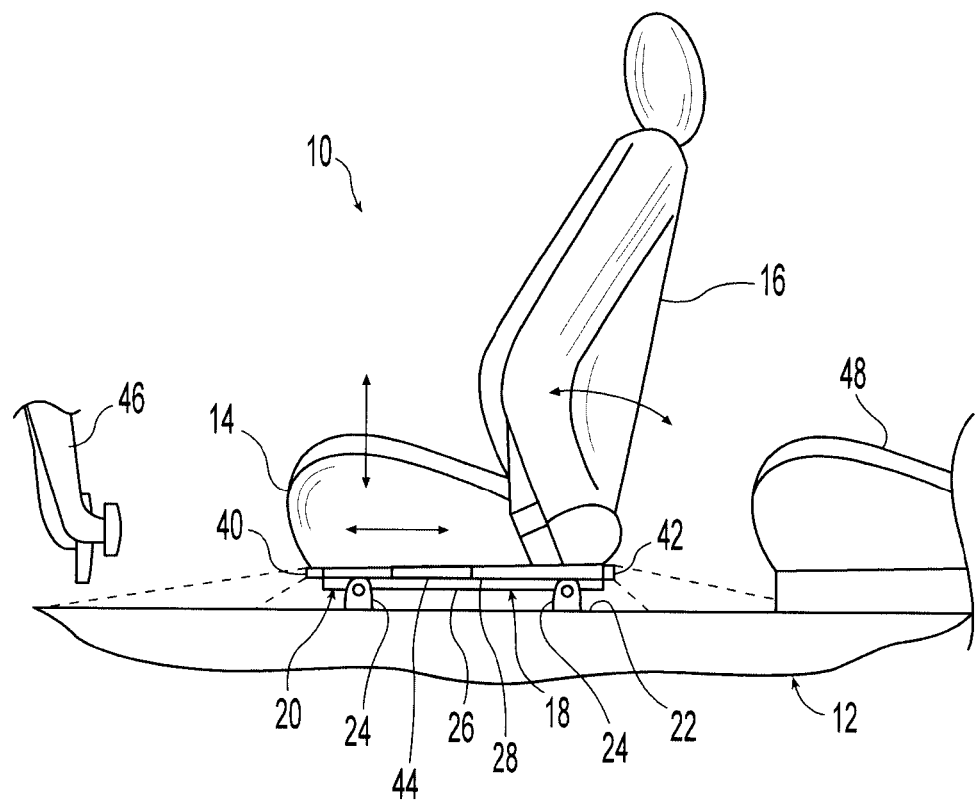
FIG. 1 is a side elevational view of a powered adjustable seat assembly of a motor vehicle having integrated lights according to the present invention.

It should be understood that the appended drawings are not necessarily to scale, presenting a somewhat simplified representation of various preferred features illustrative of the basic principles of the invention. The specific design features of a powered adjustable vehicle seat assembly as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the powered adjustable seat assembly illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the vehicle, that is, to the left within the plane of the paper in FIG. 1 and aft or rearward refers to a direction toward the rear of the vehicle, that is, to the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved powered adjustable seat assemblies disclosed herein. The following detailed discussion of various alternative and preferred embodiments will illustrate the general principles of the invention with reference to a preferred embodiment. Other embodiments suitable for other applications will be apparent to those skilled in the art given the benefit of this disclosure.

Figure 2:
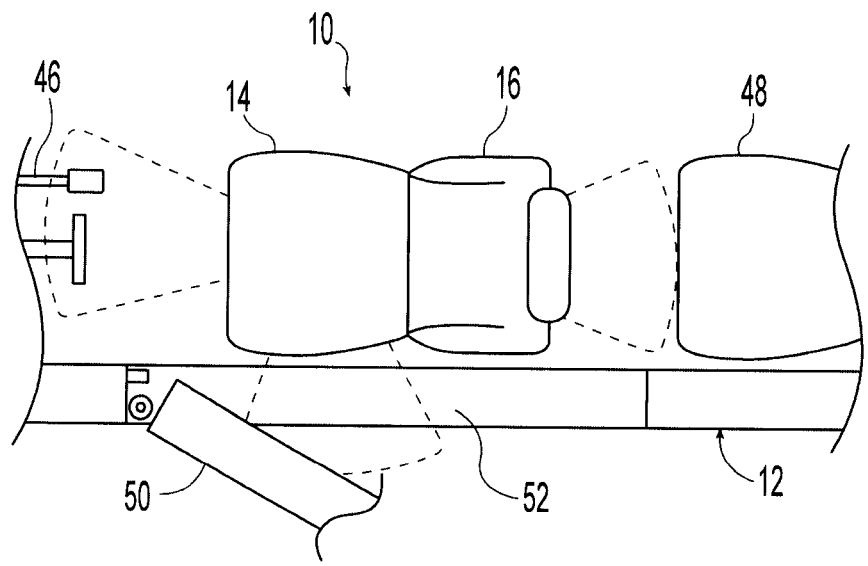
FIG. 2 is a top plan view of the powered adjustable seat assembly of FIG. 1.
Figure 3:
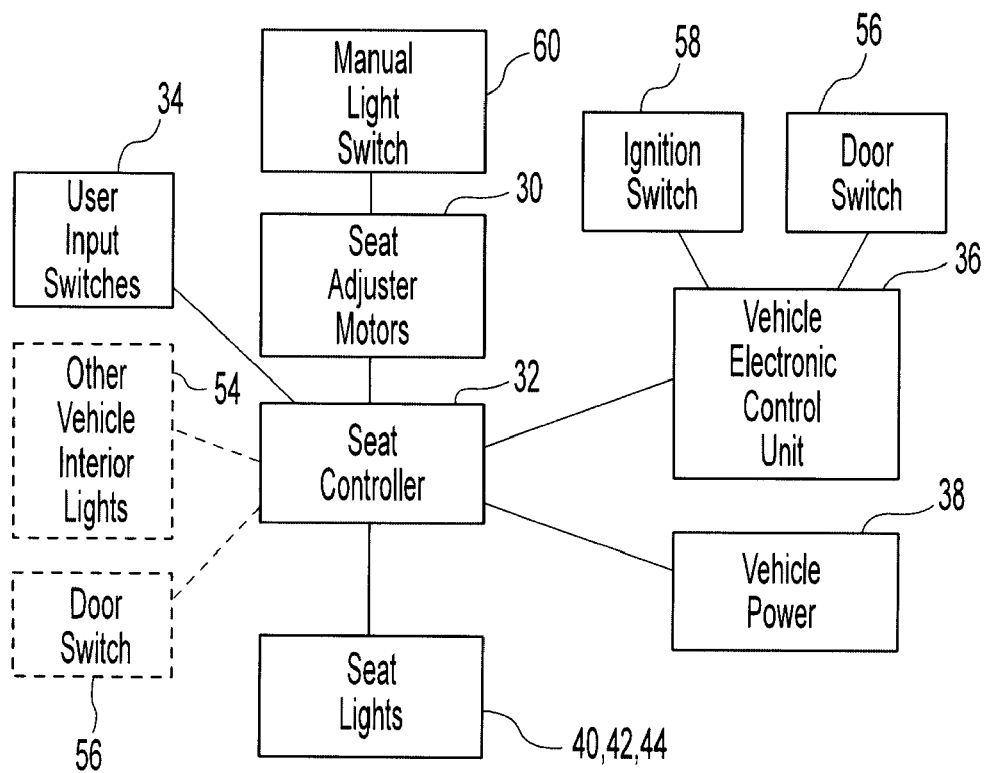
FIG. 3 is schematic view of the powered adjustable seat assembly of FIGS. 1 and 2.

Referring now to the drawings, FIGS. 1 to 3 show a powered adjustable seat assembly 10 of a motor vehicle 12 according to a preferred embodiment of the present invention. The illustrated seat assembly 10 includes a seat bottom 14 and a seat back 16 mounted within the motor vehicle 12 on a mounting assembly or adjuster mechanism 18. The illustrated seat back 16 is pivotable with respect to the seat bottom 14. The illustrated seat assembly I/O is an "eight-way" powered adjustable seat providing horizontal (fore/aft), front vertical (up/down), rear vertical (up/down), recline (angular) adjustment (as indicated by the arrows in FIG. 1). It is understood, however, that the present invention described herein can alternatively be utilized with "two-way", "four-way", "six-way", or other adjustable seat assemblies.

The illustrated adjuster mechanism 18 includes a pair of substantially parallel and laterally spaced-apart track assemblies 20 which extend in a longitudinal or forward/rearward direction of the motor vehicle. The track assemblies 20 are mounted to a vehicle floor or other structure 22 such as a vehicle floor by mounting brackets 24.

Each track assembly 18 includes a first or fixed track 26 and a second or movable track 28. The illustrated first track 26 is a lower track and fixedly mounted to the vehicle structure 22 by the mounting brackets 24. The illustrated second track 28 is an upper track supported by the first track 26 so that the second track 28 selectively moves or slides in a forward or rearward direction relative to the first track 24 to adjust the forward/rearward position of the seat bottom 14. It is noted that the track assemblies 18 can alternatively have any other suitable configuration such as, for example, the upper track can be fixed with the lower track being movable relative thereto or the tracks can be positioned laterally beside one another.

An electric drive motor 30 is operably connected to the second tracks 28 to selectively move the second tracks 28 relative to the first tracks 26. The drive motor 30 is preferably a D.C. motor. It is noted that there are also additional electric drive motors 30 to move the seat bottom 14 and the seat back 16 in the vertical and recline directions. A seat controller or electronic control unit (ECU) 32 is operably connected to the drive motors 30 so that the user can selectively activate the motor 30 to move the seat by operation of a user input switches 34. The seat controller is in communication with a vehicle controller or electronic control unit (ECU) 36 and vehicle power 38.

The illustrated seat assembly also includes integrated interior lamps or lights 40, 42, 44 that are located below the seat bottom 14 at the adjuster mechanism 18. The illustrated lights 40, 42, 44 are located at movable portion of the adjuster mechanism 18 so that the lights 40, 42, 44 move with the seat bottom 14 relative to the vehicle floor 22 during adjustment but can alternatively located at a fixed portion of the adjuster mechanism 18 to remain in a fixed location relative to the vehicle floor 22. The illustrated seat assembly includes three interior lights 40, 42, 44: a front light 40 located at the front of the seat assembly 10 that directs light in a forward direction toward driver control pedals 46; a rear light 42 located at the rear of the seat assembly 10 that directs light in a rearward direction toward a rear passenger seat 48, and a side light 44 located at the lateral side of the seat assembly 10 that directs light in a lateral direction toward a vehicle door 50 and door opening 52 so that light is directed out of the vehicle when the door 50 is open. It is noted that one, two or all of the three illustrated lights 40, 42, 44 can be utilized. It is also noted that other quantities of the lights 40, 42, 44 and/or other locations for the lights 40, 42, 44 can be utilized.

The lights 40, 42, 44 each include a suitable light source such as, for example, a light emitting diode (LED), incandescent lamp, or the like. It is noted that LEDs are preferable because they are available in a plurality of colors (white, blue, red, and amber), use very low power, are extremely reliable over a long life, and do not radiate heat. It is noted that the lights 40, 42, 44 can each have a single light source, a plurality of light sources, an array of light sources, or any other suitable configuration. The light sources can be located at the lights 40, 42, 44 or can be located at any other suitable location and directed to the lights 40, 42, 44 by light pipes or the like. For example, the light sources can be located at a printed circuit board of the seat controller 32 and directed to the desired location by the light pipes.

The seat controller 20 preferably controls operation of the lights 40, 42, 44. Thus, an existing processor and other components can be utilized so that very few drive components are needed other than those existing in prior art powered adjustable seats. The seat controller 32 is preferably adapted to achieve dimming and brightening of the lights 40, 42, 44 through software programming. For example, intensity of the lights 40, 42, 44 can be achieved by pulse width modulation (PWM) control. It is noted that the seat controller 20 can also be utilized to drive/control other interior lights that are in close proximity of the seat assembly 10 in order to reduce the needed vehicle harness wiring.

The seat controller 20 can be adapted to activate or energize one or more of the lights 40, 42, 44 when the user engages the input switch 34 to move the seat assembly 10 to give a visual indication that the seat assembly 10 is operating and/or moving and to illuminate areas where the seat assembly 10 may be moving so that the operator is more likely see any obstructions. The seat controller 20 can active all of the lights 40, 42, 44 when the seat assembly is moving or only the light 40, 42, 44 directed in the direction that the seat assembly 10 is moving. Alternatively, the seat controller 20 can be adapted to activate or energize one or more of the lights, 40, 42, 44 when the seat controller 20 determines is aware that there is an obstruction that is being engaged by the seat assembly 10 during movement of the seat assembly 10. The seat controller 20 can active all of the lights 40, 42, 44 when there is an obstruction detected or only the light 40, 42, 44 directed in the direction that the seat assembly 10 is moving and engaging the obstruction. The controller 20 can also be adapted to activate or energize one or more of the lights 40, 42, 44 when the vehicle door 50 is open to provide ingress/egress illumination. The controller 20 is in communication with a door switch 56 via the vehicle bus controls or ECU 36 to determine when the door 50 is open or closed. Alternatively, the seat controller 20 can be directly wired to the door switch 56. The driver or passenger door 50 can activate the adjacent driver or passenger seat assembly independently or both the driver an passenger seat assemblies 10 together. Low power consumption of the lights 40, 42, 44 may allow illumination during engine cranking. It is noted that the controller 20 can be adapted to additionally or alternatively activate or energize one or more of the lights, 40, 42, 44 based on any other suitable predetermined condition such as, for example, activation of an ignition switch 58 and/activation of a manual light switch 60.

It is apparent from the forgoing that the present invention provides an improved powered adjustable seat assembly 10 that simplifies execution of interior lighting. The interior lighting provides visually pleasing interior accent lighting as well safety lighting by providing ingress and egress illumination, illumination to view potential obstacles during movement of the seat assembly 10, and a road-side visual illumination indicator to passing traffic when the vehicle door 50 is open. The integrated interior lighting is easy to assemble with the seat adjuster mechanism 18, is relatively inexpensive, does not add additional vehicle wiring, and a light source that moves with the seat. It is noted that these improvements are made without substantially increasing the cost of the seat assembly 10.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A powered adjustable seat assembly for a motor vehicle comprising, in combination:
    a seat;
    an adjuster mechanism operatively connected to the seat to adjust the seat in at least one direction;
    wherein the adjuster mechanism includes an electric drive motor;
    a controller operatively connected to the drive motor to selectively adjust the seat; and
    at least one light located below the seat and operatively connected to the controller to selectively illuminate the light.

2. The powered adjustable seat assembly according to claim 1, wherein the light is secured to a moving portion of the adjuster mechanism so that the light moves with the seat when the seat is adjusted.

3. The powered adjustable seat assembly according to claim 1, wherein the light includes an LED.

4. The powered adjustable seat assembly according to claim 1, wherein the light is positioned to direct illumination in a forward direction toward operator pedals.

5. The powered adjustable seat assembly according to claim 1, wherein the light is positioned to direct illumination in a rearward direction toward a rear seat.

6. The powered adjustable seat assembly according to claim 1, wherein the light is positioned to direct light in a lateral direction toward a vehicle door.

7. The powered adjustable seat assembly according to claim 1, wherein the controller is adapted to activate the light when the seat is moving.

8. The powered adjustable seat assembly according to claim 1, wherein the controller is adapted to activate the light when an obstruction to movement of the seat is detected.

9. The powered adjustable seat assembly according to claim 1, wherein the controller is adapted to activate the light when a vehicle door is open.

10. The powered adjustable seat assembly according to claim 1, wherein the controller is adapted to control intensity of the light with pulse width modulation control.

11. A powered adjustable seat assembly for a motor vehicle comprising, in combination:
    a seat;
    an adjuster mechanism operatively connected to the seat to adjust the seat in at least one direction;
    wherein the adjuster mechanism includes an electric drive motor;
    a controller operatively connected to the drive motor to selectively adjust the seat;
    a plurality of lights located below the seat and operatively connected to the controller to selectively illuminate the lights upon predetermined conditions; and
    wherein the lights are secured to a moving portion of the adjuster mechanism so that the lights move with the seat when the seat is adjusted.

12. The powered adjustable seat assembly according to claim 11, wherein the lights each include an LED.

13. The powered adjustable seat assembly according to claim 11, wherein at least one of the lights is positioned to direct illumination in a forward direction toward operator pedals.

14. The powered adjustable seat assembly according to claim 11, wherein at least one of the lights is positioned to direct illumination in a rearward direction toward a rear seat.

15. The powered adjustable seat assembly according to claim 11, wherein at least one of the lights is positioned to direct light in a lateral direction toward a vehicle door.

16. The powered adjustable seat assembly according to claim 11, wherein the controller is adapted to activate at least one of the lights when the seat is moving.

17. The powered adjustable seat assembly according to claim 11, wherein the controller is adapted to activate at least one of the lights when an obstruction to movement of the seat is detected.

18. The powered adjustable seat assembly according to claim 11, wherein the controller is adapted to activate at least one of the lights when a vehicle door is open.

19. The powered adjustable seat assembly according to claim 11, wherein the controller is adapted to control intensity of the lights with pulse width modulation control.

20. A powered adjustable seat assembly for a motor vehicle comprising, in combination:
a seat;
an adjuster mechanism operatively connected to the seat to adjust the seat in at least one direction;
wherein the adjuster mechanism includes an electric drive motor;
a controller operatively connected to the drive motor to selectively adjust the seat;
a plurality of lights located below the seat and operatively connected to the controller to selectively illuminate the lights upon predetermined conditions;
wherein at least one of the lights is positioned to direct illumination in a forward direction toward operator pedals;
wherein at least one of the lights is positioned to direct illumination in a rearward direction toward a rear seat; and
wherein at least one of the lights is positioned to direct light in a lateral direction toward a vehicle door.

* * * * *